Figure 1:
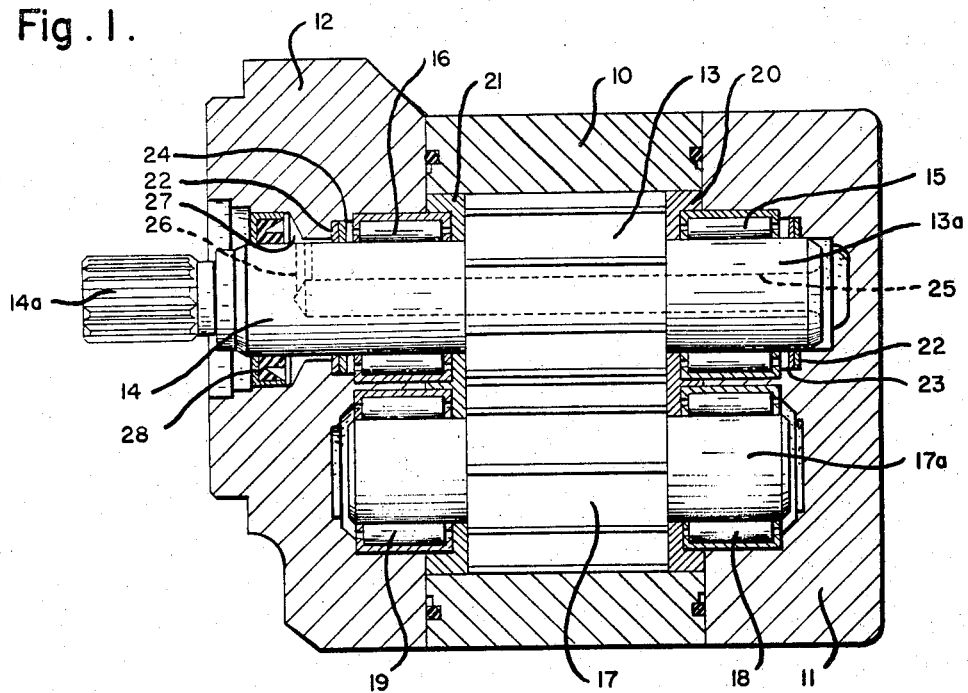

Jan. 14, 1969   J. L. BOOP ET AL   3,421,769

SHAFT SEALS

Filed Aug. 27, 1964

INVENTORS
John L. Boop &
Robert F. Hodgson

United States Patent Office 3,421,769
Patented Jan. 14, 1969

3,421,769
SHAFT SEALS
John L. Boop, Youngstown, and Robert F. Hodgson, Canfield, Ohio, assignors to Commercial Shearing & Stamping Company, a corporation of Ohio
Filed Aug. 27, 1964, Ser. No. 392,418
U.S. Cl. 277—58    6 Claims
Int. Cl. F16j 15/00; F16j 9/00; F16k 41/00

This invention relates to shaft seals and particularly to a high pressure shaft seal for rotary shafts such as the shafts of hydraulic pumps, motors and the like. Since these shafts rotate at high speeds and the seal bearings rotate on the same small area at all times, the problems associated with sealing such shafts are much greater than those associated with reciprocating seals or low pressure, low speed seals on rotary shafts. In the past it has been necessary to use bronze fixed clearance seals which, in the case of gear pumps, permitted substantial leakage and placed a considerable load on the enclosed shaft end. This in turn required that the driven gear be splined on the driven shaft rather than integral therewith and that a thrust bearing be provided on the shaft to take the load on the shaft end. In order to accommodate the thrust bearing and the seals, the housing had to be materially enlarged. All this drastically increased the cost of high pressure pumps over low pressure pumps and motors.

In the present invention we have markedly reduced the leakage at the seal, for example, in one common type high pressure gear pump the leakage has been reduced from about 1 gallon to 0.1 gallon per minute. This permits the elimination of back pressure on the shaft end and the previously necessary thrust bearing. In turn the need for splining the driven shaft in the driven gear is eliminated and the driven gear and driven shaft can be made as an integral unit as in low pressure pumps. All of this reduces the cost of high pressure pumps and motors to a fraction of their former cost.

Preferably we provide in a housing having spaced end members and a rotatable shaft journaled in said end members, an annular well in each of said end members opening into the interior of the housing and concentric with the rotatable shaft, said end wells having a major surface in a plane transverse to the axis of the shaft and a pair of annular rings in each said well, said rings having a major surface parallel with the major surface area of the well and a minor surface area coaxial with the shaft, said rings each having a radial crack or slot, normally closed, permitting expansion of the ring, the cracks of each pair of rings being out of alignment one with the other.

In a preferred embodiment of a pump according to our invention we provide a pump housing, a driven shaft journaled in the housing and having one end extending out of the housing to receive a driving element, a driven gear integral with the driven shaft, an idler gear journaled in the housing meshing with the driven gear, a seal well in the housing adjacent each end of the shaft and a pair of annular metal rings in each said seal well, said rings having a major surface area in a plane transverse to the axis of the shaft and a minor surface area coaxial with the shaft, said rings each having a radial crack permitting expansion of the ring, the cracks of each pair of rings being out of alignment and said rings fitting tightly on the shaft and bearing against one another and the seal well over the major surface of the ring. Preferably the rings are of cast iron and are fractured at one point on a radial line.

Figure 2:
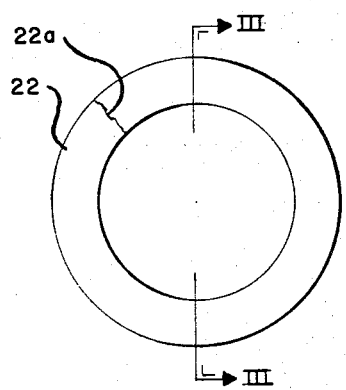
Figure 3:
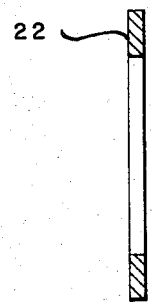

In the foregoing general description we have set out certain objects, advantages and purposes of our invention. Other objects, advantages and purposes will be apparent from a consideration of the following description and the accompanying drawings in which FIGURE 1 is a longitudinal section through a gear pump incorporating our invention;
FIGURE 2 is an elevational view of a sealing ring according to our invention; and
FIGURE 3 is a section on the line III—III of FIGURE 2.

Referring to the drawing we have illustrated a pump housing made up of a center shell 10 and end bells 11 and 12. A driven gear 13 on an integral stub shaft 13a and a driven shaft 14 is journaled in bearings 15 in end bell 11 and 16 in end bell 12. An idler gear 17 with integral stub shafts 17a is journaled in bearings 18 in end bell 11 and 19 in end bell 12. Thrust plates 20 and 21 are provided between the bearings and the gears. A pair of annular cast iron rings 22 fractured on line 22a are inserted around shaft 13a in annular well 23 in end bell 11. A like pair of cast iron rings 22 are inserted around shaft 14 in annular well 24 in end bell 12. A central passage 25 through shaft 13a, gear 13 and shaft 14 communicates with radial passage 26 in shaft 14 which discharges through the sidewall of shaft 14 in chamber 27 behind seal 28.

In operation the shaft 14 is driven from an external source of power through spline 14a on its end, thereby rotating gear 13 and idler gear 17. Oil from a reservoir (not shown) is drawn between the gear teeth of the two gears and ejected under pressure. The oil under pressure within the housing works through thrust plates 20 and 21, bearings 15, 16, 18 and 19 into wells 23 and 24. This pressure acts against the large exposed face of the innermost ring 22 of the pair of rings forcing them into tight engagement with the back wall of the well in which they are located. This holds the rings in frictional and sealing engagement with the well and prevents their rotation. At the same time the shafts 13a and 14 rotate within the rings in very close engagement so that only a very small flow of fluid occurs. The fluid which escapes is bled off through passages 25 and 26 and chamber 27 so that no effective back pressure on rings 22 can occur. Since the leaking along the shafts is very small, this practice of bleeding off the leaking can effectively be carried out, thereby eliminating pressure on the seals and on the end of shaft 13a. This in turn eliminates the need for thrust bearings and for independent mounting of the driven gear on the driven shaft. Each of the rings 22 has an inner diameter slightly smaller than the outer diameter of the shaft on which it is mounted and the paired rings are positioned so that the cracks or fractures 22a of the pair rings are not in alignment. Since the area of the face of the ring is large as compared with the area with the inner diameter, the frictional engagement on the well wall is sufficient to hold the rings against rotation thus forming a static seal in the end bell and a rotary seal on the shaft. This arrangement permits the ring to expand and contract with temperature change, to compensate for misalignment, to compenate for wear and to be pressed onto the shaft without the need for tolerances normally associated with a press fit. This is all a result of the rings 22 being thin as compared with their large face area.

While we have illustrated and described certain presently preferred embodiments of our invention in the foregoing specification it will be understood that this invention may be otherwise embodied within the scope of the following claims.

We claim:
1. In a housing for containing fluid under pressure having an end member and a rotatable shaft journaled in said end member, a sealing structure comprising an annular well in said end member opening into the interior of the housing and concentric with the rotatable shaft, said annular well having a major surface in a plane transverse to the axis of the shaft and at least one separate, single, metal ring mounted on and concentric with said shaft in said well and axially slidable on said shaft, said ring having a major surface parallel with the major surface of the well and a minor surface area coaxial with and contacting the shaft, said ring having a single radial crack permitting expansion of the ring, and said ring being free of any closely surrounding confining means.

2. In a housing for containing fluid under pressure having spaced end members and a rotatable shaft journaled in said end members, a sealing structure comprising an annular well in each said end members opening into the interior of the housing and concentric with the rotatable shaft, said annular wells having a major surface in a plane transverse to the axis of the shaft and a pair of separate, single, metal rings mounted on and concentric with said shaft in each said well axially slidable on said shaft, said rings having a major surface parallel with the major surface of the well and a minor surface area coaxial with and contacting the shaft, said rings each having a single radial crack permitting expansion of the ring, the cracks of each pair of rings being out of alignment one with the other and said rings being free of any closely surrounding confining means.

3. In a housing for containing fluid under pressure having spaced end members and a rotatable shaft journaled in said end members, a sealing structure comprising an annular well in each of said end members opening into the interior of the housing and concentric with the rotatable shaft, said annular wells having a major surface in a plane transverse to the axis of the shaft and a pair of separate, single, metal rings mounted on and concentric with said shaft in each said well axially slidable on said shaft, said rings having a major surface parallel with the major surface of the well and a minor surface area coaxial with and contacting the shaft in sealing engagement, said major surface of each ring being so proportioned that the frictional force of the major surface of the ring acted on by the fluid under pressure against the major surface of the well is greater than the frictional force of the minor surface of the ring on the shaft whereby the ring is held against rotation in the well, said rings each having a single radial crack permitting expansion of the ring, the cracks of each pair of rings being out of alignment one with the other and said rings being free of any closely surrounding confining means.

4. In a rotary gear pump, a housing having spaced end members and a rotatable driven shaft journaled in said end members having a driven gear thereon, an idler gear journaled in the housing on a shaft parallel to the driven shaft, a sealing structure on the driven shaft comprising an annular well in each said end members opening into the interior of the housing and concentric with the driven rotatable shaft, said annular wells having a major surface in a plane transverse to the axis of the shaft and a pair of separate, single, metal rings mounted on and concentric with said shaft in each said well axially slidable on said shaft, said rings having a major surface parallel with the major surface of the well and a minor surface area coaxial with and contacting the shaft, said rings each having a single radial crack permitting expansion of the ring, the cracks of each pair of rings being out of alignment one with the other and said rings being free of any closely surrounding confining means.

5. In a rotary gear pump, a housing having spaced end members and a rotatable driven shaft journaled in said end members having a driven gear thereon, an idler gear meshing with the driven gear and journaled in the end members on a shaft parallel to the driven shaft, a sealing structure comprising an annular well in each said end members opening into the interior of the housing and concentric with the driven rotatable shaft, said annular wells having a major surface in a plane transverse to the axis of the driven shaft and a pair of separate, single, metal rings mounted on and concentric with said shaft in each said well axially slidable on said shaft, said rings having a major surface parallel with the major surface of the well and a minor surface area coaxial with and contacting the shaft in sealing engagement, said major surface of each ring being so proportioned that the frictional force of the major surface of the ring acted upon by the fluid under pressure against the major surface of the well is greater than the frictional force of the minor surface of the ring on the shaft whereby the ring is held against rotation in the well, said rings each having a single radial crack permitting expansion of the ring, the cracks of each pair of rings being out of alignment one with the other and said rings being free of any closely surrounding confining means.

6. A seal for a rotary shaft comprising a single, annular cast iron ring having an opening receiving and contacting the shaft and axially slidable on said shaft, said ring having a major surface normal to the axis of the shaft and a minor surface in the interior of the opening contacting the periphery of the shaft, said ring having a single normally closed slot extending generally radially from the opening to the periphery of the ring and said ring being free of any closely surrounding confining means.

References Cited

UNITED STATES PATENTS

| | | | |
|---|---|---|---|
| 3,235,274 | 2/1966 | Cain et al. | 277—156 |
| 872,366 | 12/1907 | Ver Planck | 277—156 |
| 1,686,867 | 10/1928 | Kuhn | 103—126 |
| 2,305,276 | 12/1942 | Rushmore | 277—195 |
| 2,626,193 | 1/1953 | Patterson | 277—233 |

SAMUEL ROTHBERG, *Primary Examiner.*

D. B. MASSENBERG, *Assistant Examiner.*

U.S. Cl. X.R.

277—216